(12) United States Patent
Nakamura

(10) Patent No.: US 8,950,738 B2
(45) Date of Patent: Feb. 10, 2015

(54) VIBRATION-DAMPING SUPPORT DEVICE

(75) Inventor: Masao Nakamura, Tsuchiura (JP)

(73) Assignee: Hitachi Construction Machinery Co., Ltd., Tokyo (JP)

(*) Notice: Subject to any disclaimer, the term of this patent is extended or adjusted under 35 U.S.C. 154(b) by 347 days.

(21) Appl. No.: 12/918,654

(22) PCT Filed: Feb. 20, 2009

(86) PCT No.: PCT/JP2009/053072
§ 371 (c)(1),
(2), (4) Date: Aug. 20, 2010

(87) PCT Pub. No.: WO2009/104754
PCT Pub. Date: Aug. 27, 2009

(65) Prior Publication Data
US 2010/0327502 A1    Dec. 30, 2010

(30) Foreign Application Priority Data
Feb. 21, 2008  (JP) ................................ 2008-040255

(51) Int. Cl.
*F16F 1/373*    (2006.01)
*F16F 7/00*     (2006.01)

(52) U.S. Cl.
CPC .............. *F16F 1/3735* (2013.01); *F16F 1/3732* (2013.01)
USPC ................... 267/141.1; 267/140.13; 267/141; 267/141.4; 267/293

(58) Field of Classification Search
CPC .................. F16F 1/38; F16F 1/40; F16F 1/50; F16F 1/373; F16F 1/403; F16F 1/406; F16F 1/3732; F16F 7/00; F16F 2236/103; F16F 1/387; F16F 1/3842; B60G 2204/41
USPC .......... 188/141, 141.1, 153; 267/293, 140.13, 267/141
See application file for complete search history.

(56) References Cited

U.S. PATENT DOCUMENTS 3,430,901 A * 3/1969 Cauvin ......................... 248/573
4,252,339 A * 2/1981 Shimizu et al. ......... 280/124.108
(Continued)

FOREIGN PATENT DOCUMENTS

JP    54-28815       2/1979
JP    60-139936 U    9/1985
(Continued)

OTHER PUBLICATIONS

International Search Report dated Mar. 17, 2009 including English-language translation (Five (5) pages).
(Continued)

*Primary Examiner* — Anna Momper
*Assistant Examiner* — San Aung
(74) *Attorney, Agent, or Firm* — Crowell & Moring LLP

(57) ABSTRACT

To provide a vibration-damping support device that requires a smaller space for its own installation. A vibration-damping support device is provided with a rubber mount, a support member supporting the rubber mount thereon, and stoppers. The rubber mount is to be attached to a mounting platform for an object which is installed in a hydraulic excavator and is to be damped, for example, an engine that vibrates in vertical and horizontal directions, and has an elastic member of a rubber or like member for absorbing vibrations of the engine. The support member can be, for example, a support bracket to be fixedly secured on an unillustrated revolving frame. The stoppers are arranged integrally with the support bracket, and prevent an excessive deformation of the elastic member of the rubber mount under vibrations of the engine. The stopper is arranged on an upper side of the support bracket, while the stopper is arranged on a lower side of the support bracket. The stoppers are formed of plural plate members, which are each of a circular arc shape as viewed in plan.

7 Claims, 4 Drawing Sheets

(56) References Cited

U.S. PATENT DOCUMENTS

| | | | |
|---|---|---|---|
| 5,080,335 A * | 1/1992 | Solleder et al. | 267/141.4 |
| 5,242,146 A * | 9/1993 | Tecco et al. | 248/638 |
| 5,456,454 A * | 10/1995 | Schulz et al. | 267/293 |
| 5,842,677 A * | 12/1998 | Sweeney et al. | 248/635 |
| 2001/0040325 A1* | 11/2001 | Wolf et al. | 267/141 |
| 2006/0202400 A1* | 9/2006 | Fitzgerald | 267/293 |

FOREIGN PATENT DOCUMENTS

| | | |
|---|---|---|
| JP | 03-024333 | 2/1991 |
| JP | 3-24333 A | 2/1991 |
| JP | 4-79780 | 7/1992 |
| JP | 4-79780 U | 7/1992 |
| JP | 5-332381 A | 12/1993 |
| JP | 09-177888 | 7/1997 |
| JP | 9-177888 A | 7/1997 |

OTHER PUBLICATIONS

Chinese Office Action dated Mar. 26, 2012 (four (4) Pages).
Japanese Office Action dated Jul. 17, 2012 (three (3) Pages).

* cited by examiner

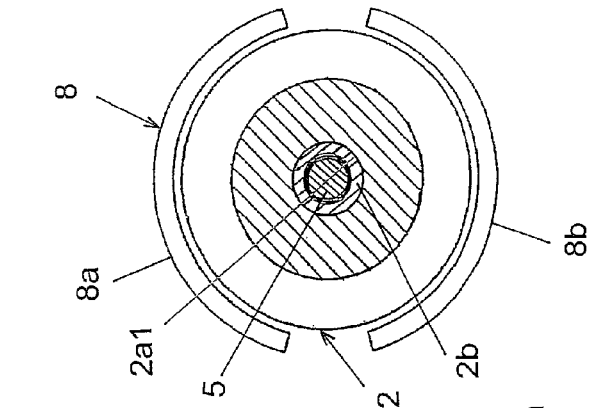
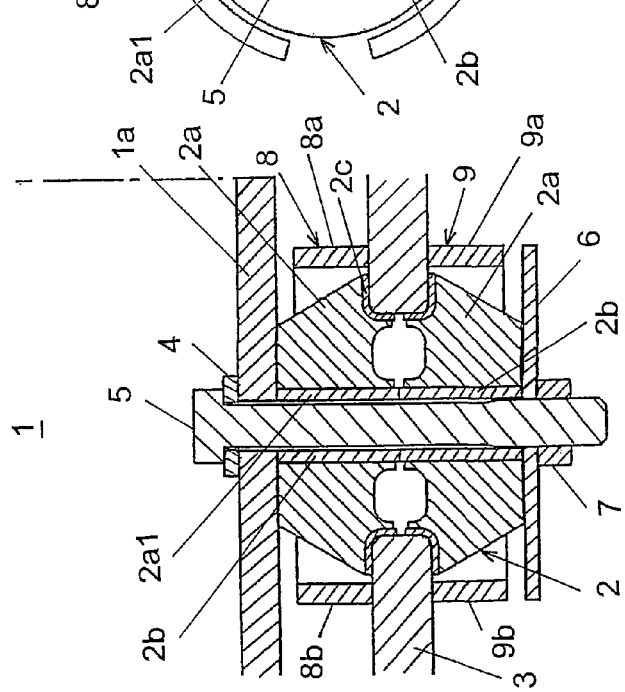
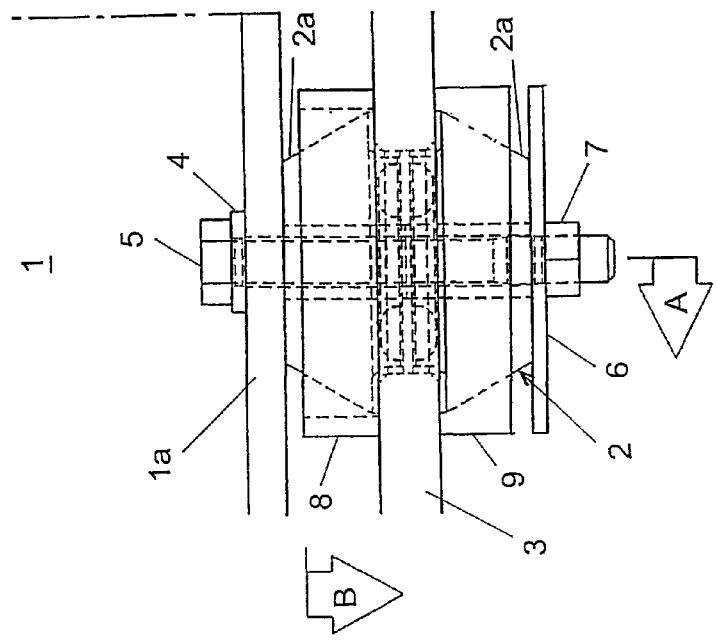

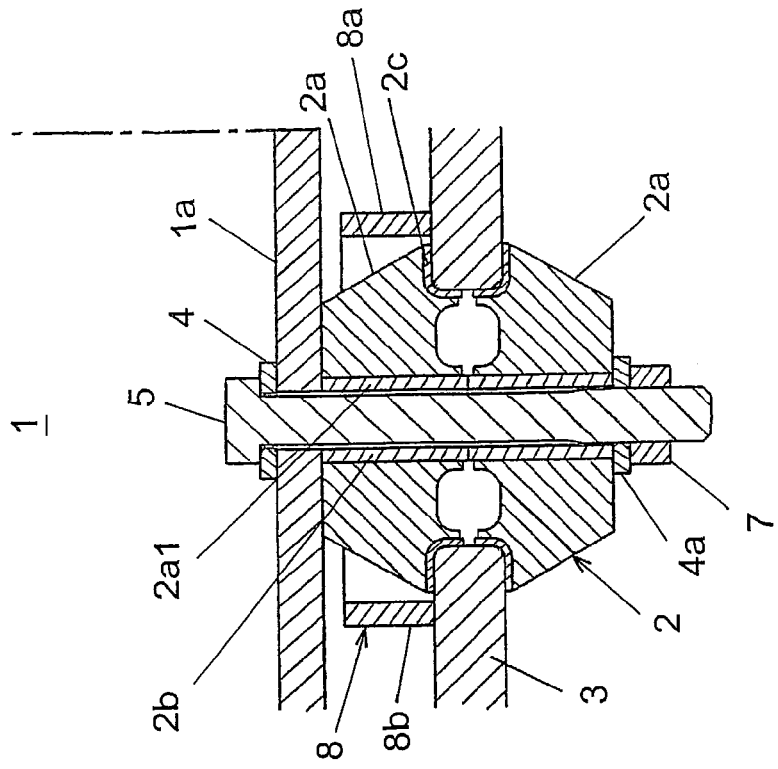
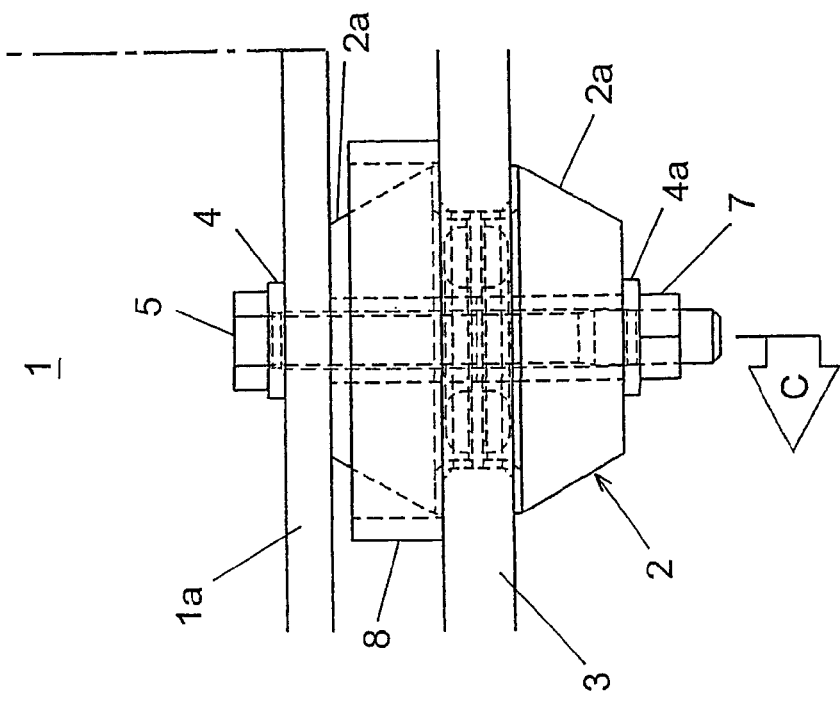

VIBRATION-DAMPING SUPPORT DEVICE

TECHNICAL FIELD

This invention relates to a vibration-damping support device useful for the vibration-isolated support or the like of an engine in a construction machine.

BACKGROUND ART

As a conventional technology of this sort, there is one disclosed in Patent Document 1. FIGS. 4A and 4B are views illustrating a conventional technology substantially equal to the vibration-damping support device disclosed in Patent Document 1, in which FIG. 4A is a front view and FIG. 4B is a cross-sectional view taken in the direction of arrow "F" of FIG. 4A.

The conventional technology illustrated in FIGS. 4A and 4B is directed to a vibration-damping engine support device to be installed on a machine such as a construction machine that is subjected to extreme vibrations in the vertical direction. This vibration-damping engine support device has a rubber mount 22, a support member supporting the rubber mount 22 thereon, specifically a support bracket 23, and stoppers 28,29. The mount is attached to a mounting platform 21a for an object to be damped, specifically an engine 21, and has an elastic member 22a for absorbing vibrations of the engine 21 in the up-and-down direction and in the left-to-right direction, that is, the horizontal direction. The stoppers 28,29 prevent an excessive deformation of the elastic member 22a of the rubber mount 22 under vibrations of the engine 21, and are each formed in a shallow cup shape.

The stopper 28 is arranged on an upper side of the support bracket 23, while the stopper 29 is arranged on a lower side of the support bracket 23. The stopper 28 arranged on the upper side is integrally attached to the mounting platform 21a for the engine 21 via a bolt 25, and the stopper 29 arranged on the lower side is integrally attached to the bolt 25. The elastic member 22a of the rubber mount 22 is held between the upper stopper 28 and the lower stopper 29.

It is to be noted that the vibration-damping support device is held beforehand such that, when it is attached to the mounting platform 21a for the engine 21, the stopper 28 and the elastic member 22a of the rubber mount 22 sag under the weight of the engine 21 itself. As a result, the clearance between the stopper 28 and the support bracket 23 becomes smaller than that between the stopper 29 and the support bracket 23. Consequently, the prevention of a deformation of the elastic member 22a under vibrations of the engine 21 in the vertical direction is achieved primarily by a contact of the upper stopper 28 to the support bracket 23.

According to the conventional technology constructed as described above, when the engine 21 is driven and vibrates in the vertical direction and horizontal direction, vibrations of the engine 21 are absorbed by deformations of the elastic member 22a of the rubber mount 22. Even when vibrations of the engine 21 in the vertical direction become large and the upper stopper 28 arranged integrally with the engine 21 comes into contact with an upper surface of the support bracket 23, the elastic member 22a is prevented from any further, excessive deformation. If vibrations of the engine 21 in the vertical direction become significantly large, for example, occasionally for any reason, the lower stopper 29 comes into contact with a lower surface of the support bracket 23. As a consequence, any excessive deformation of the elastic member 22a is prevented.

Any excessive deformation of the elastic member 22a of the rubber mount 22 under vibrations of the engine 21 is prevented by the stoppers 28,29 as described above, and the elastic member 22a is protected from damage. Therefore, durability of the rubber 22 is secured.

Patent Document 1: JP-A-9-177888

DISCLOSURE OF THE INVENTION

Problem to be Solved by the Invention

In the conventional technology, the stopper 28 is integrally attached to the mounting platform 21a for the engine 21, and the stopper 29 is integrally secured to the bolt 25 that attaches the stopper 28 to the mounting platform 21a for the engine 21, as mentioned above. Therefore, the stoppers 28,29 move in the horizontal direction in direct response to a vibration of the engine 21 in the horizontal direction. To avoid an interference between the stoppers 28,29 and the elastic member 22a of the rubber mount 22 for the protection of the elastic member 22a from damage by the stoppers 28,29 in the course of the above-described movement of the stoppers 28,29 in the horizontal direction, there is no choice for the conventional technology other than setting a relatively-large horizontal clearance, that is, space between the stoppers 28,29 and the elastic member 22a of the rubber mount 22. As a consequence, the stoppers 28,29 have a large outer diameter dimension so that the vibration-damping support device tends to require a large installation space. There is, hence, a problem in that the vibration-damping support device reduces a installation space for equipment to be installed around the vibration-damping support device although the installation space has to be left open large enough to avoid an interference between the equipment and the vibration-damping support device.

Especially when a machine in which the conventional vibration-damping support device is to be installed is one that is prone to restrictions on an installation space for equipment, such as a hydraulic excavator of the small swing radius type, the above-mentioned conventional vibration-damping support device may be hardly installed in some instances.

It is to be noted that in the above-mentioned conventional technology, the stoppers 28,29 are each in a shallow cup shape and such a shallow cup shape is formed by pressing a plate material. It is, therefore, necessary to machine the stoppers 28,29 by using a large-capacity press machine. As a consequence, the manufacture of the vibration-damping support device requires large-scale facilities, and tends to result in high manufacturing cost. If the plate material to be used for the manufacture of the stoppers 28,29 has a large thickness dimension, there is a potential problem in that the manufacture of the shallow-cup-shaped stoppers 28,29 may not be realized by such press work.

With the foregoing circumstances of the above-mentioned conventional technology in view, the present invention has as an object thereof the provision of a vibration-damping support device that requires a smaller space for its own installation.

Means for Solving the Problem

To achieve the above-described object, a vibration-damping support device according to the present invention is characterized in that in the vibration-damping support device provided with a mount, which is to be attached to an object to be damped and has an elastic member for absorbing vibrations of the object to be damped, a support member supporting the mount thereon, and a stopper for preventing an excessive deformation of the elastic member in an up-and-down direction under the vibrations, the stopper is arranged integrally with the support member.

In the present invention constructed as described above, when the object to be damped is driven and vibrates, its vibrations are absorbed by deformations of the elastic member of the mount. Even when vertical vibrations of the object to be damped become large and the object to be damped comes into contact with the stopper arranged integrally with the support member, any further deformation of the elastic member is prevented so that the elastic member is protected from damage. As a consequence, durability of the mount can be secured.

Even when the object to be damped is driven and vibrates, the stopper can be maintained in a stationary state without moving under vibrations of the object to be damped although the elastic member of the mount supported on the support member deforms under the vibrations of the object to be damped, because the stopper is arranged integrally with the support member that can be maintained stationary. Further, the stopper is integrally arranged on the same support member as that supporting the elastic member of the mount. By making consideration about the shape and dimensions of the elastic member, the elastic member of the mount and the stopper can be arranged without occurrence of an interference between them under vibrations of the object to be damped although substantially no clearance is left open between them. As a consequence, the outer diameter dimension of the stopper can be reduced, thereby making it possible to reduce a space required for the installation of the vibration-damping support device itself according to the present invention.

The vibration-damping support device according to the present invention may also be characterized in that in the above-described invention, the vibration-damping support device is to be installed in a construction machine, the object to be damped comprises an engine, and the stopper comprises a plate member surrounding the elastic member of the mount.

The present invention constructed as described above is effective for the damping of the engine installed in the construction machine. Further, it is unnecessary to form the stopper in a shallow cup shape. Upon manufacturing the stopper by press work, it can hence be manufactured by using a press machine of relatively small capacity. Moreover, the stopper may be manufactured in some instances by cutting work which is simpler than press work. The manufacture of the stopper can be facilitated whichever machining work is adopted.

The vibration-damping support device according to the present invention may also be characterized in that in the above-described invention, the stopper comprises a plurality of plate members.

The present invention constructed as described above can secure a desired stopper function, specifically a deformation preventing function for the elastic member of the mount by the plate members by setting beforehand the thickness dimension of each of the plate members such that upon contact of the engine with the respective plate members, the contact areas of the plate members become large enough to retain strength such that the elastic member is not damaged by the contact of the engine. Moreover, the material cost can be saved upon manufacture of the stopper by arranging the plate members with spaces formed between the plate members at their corresponding opposite end portions.

The vibration-damping support device according to the present invention may also be characterized in that in the above-described invention, the plate members are each formed in a circular arc shape as viewed in plan or a polygonally bent shape as viewed in plan. According to the present invention constructed as described above, the plate members are simple in shape, and therefore, can be manufactured easily.

Further, the vibration-damping support device according to the present invention may also be characterized in that in the above-described invention, the elastic member of the mount comprises a pair of truncated cones arranged symmetrically about a horizontal plane, one of the paired truncated cone, said one truncated cone being located on an upper side, is to be arranged on a side closer to the engine, the support member comprises a support bracket for supporting thereon the elastic member at a vertically middle part thereof, and the plate member or one of the plate members is arranged on an upper side of the support bracket such that the plate member or the one plate member surrounds the one truncated cone located on the upper side.

In the present invention constructed as described above, when the engine is driven and vibrates, its vibrations are absorbed by the paired truncated cones of the mount. Even when vertical vibrations of the engine become large and the engine comes into contact with the plate member making up the stopper on the upper side of the support bracket, any further deformation of one of the paired truncated cones, said one truncated cone being located on the upper side, is prevented so that the paired truncated cones are protected from damage. As a consequence, durability of the mount can be secured.

Even when the engine is driven and vibrates, the plate member or plate members, which make up the stopper, can be maintained stationary although the paired truncated cones supported on the support bracket deform under the vibrations of the engine, because the plate member or plate members are arranged integrally with the support bracket that can be maintained stationary. Further, the paired truncated cones and the plate member or plate members can be arranged without occurrence of an interference between them under vibrations of the engine although substantially no clearance is left open between them. As a consequence, the outer diameter dimension or dimensions of the plate member or members making up the stopper can be reduced, thereby making it possible to reduce a space required for the installation of the vibration-damping support device itself according to the present invention.

Advantageous Effects of the Invention

In the present invention, the stopper for preventing an excessive deformation of the elastic member in the up-and-down direction under vibrations of the object to be damped is integrally arranged on the mount having the elastic member that absorbs the vibrations of the object to be damped, and therefore, the stopper can be maintained stationary upon vibration of the object to be damped. Further, the mount is integrally arranged on the same support member as that supporting the elastic member of the mount. By making consideration about the shape and dimensions of the elastic member, the elastic member of the mount and the stopper can be arranged without occurrence of an interference between them under vibrations of the object to be damped although substantially no clearance is left open between them. As a consequence, the outer diameter dimension of the stopper can be reduced, thereby making it possible to reduce a space required for the installation of the vibration-damping support device itself according to the present invention. It is, therefore, possible to provide the layout design of equipment, which is to be installed around the vibration-damping support device according to the present invention, with a greater degree of freedom compared with that available in the conventional technology, and therefore, the vibration-damping support device according to the present invention can also be installed even in a machine that is prone to restrictions on an installation space for equipment, such as a hydraulic excavator of the small swing radius type.

BRIEF DESCRIPTION OF THE DRAWINGS

FIGS. 1A to 1C are views illustrating a first embodiment of the vibration-damping support device according to the present invention, in which FIG. 1A is a front view, FIG. 1B is a cross-sectional view taken in the direction of arrow "A" of FIG. 1A, and FIG. 1C is a cross-sectional view taken in the direction of arrow "B" of FIG. 1A.

FIGS. 2A and 2B are views illustrating a second embodiment of the vibration-damping support device according to the present invention, in which FIG. 2A is a front view and FIG. 2B is a cross-sectional view taken in the direction of arrow "C" of FIG. 2A.

FIGS. 3A to 3C are views illustrating a third embodiment of the present invention, in which FIG. 3A is a front view, FIG. 3B is a cross-sectional view taken in the direction of arrow "D" of FIG. 3A, and FIG. 3C is a cross-sectional view taken in the direction of arrow "E" of FIG. 3A.

FIGS. 4A and 4B are views illustrating a conventional technology substantially equal to the vibration-damping support device disclosed in Patent Document 1, in which FIG. 4A is a front view and FIG. 4B is a cross-sectional view taken in the direction of arrow "F" of FIG. 4A.

BEST MODES FOR CARRYING OUT THE INVENTION

Figure 3C:
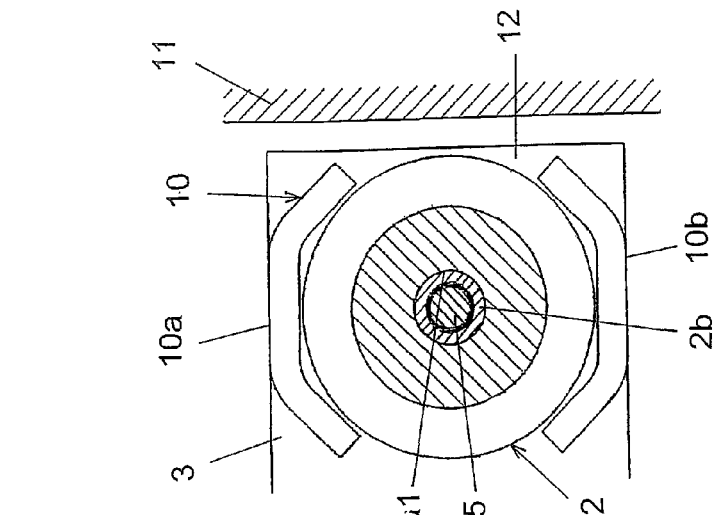

Best modes for carrying out the vibration-damping support device according to the present invention will hereinafter be described with reference to drawings.

FIGS. 1A to 1C are views illustrating a first embodiment of the vibration-damping support device according to the present invention, in which FIG. 1A is a front view, FIG. 1B is a cross-sectional view taken in the direction of arrow "A" of FIG. 1A, and FIG. 1C is a cross-sectional view taken in the direction of arrow "B" of FIG. 1A.

The vibration-damping support device according to the first embodiment is useful upon mounting an engine 1 on a body (revolving) frame in a construction machine such as a hydraulic excavator, and as illustrated in FIGS. 1A and 1B, is provided with a mount, for example, a rubber mount 2, a support member supporting the rubber mount 2 thereon, for example, a support bracket 3, and stoppers 8,9. The mount is to be attached to a mounting platform 1a for an object to be damped, for example, an engine 1, and has an elastic member for absorbing vibrations of the engine 1 in the up-and-down direction and in the horizontal direction. The elastic member is made of rubber or the like. The support bracket 3 is fixedly secured, for example, on the unillustrated revolving frame. The stoppers 8,9 prevent an excessive deformation of the elastic member of the rubber mount 2 under vibrations of the engine 1.

The elastic member of the rubber mount 2 is formed of a pair of truncated cones 2a arranged, for example, symmetrically about a horizontal plane. One of the paired truncated cones 2a, said one truncated cone 2a being located on an upper side, is arranged such that it is located close to the engine 1. The elastic member formed of the paired truncated cones 2a is supported at a vertically middle part thereof by the above-mentioned support bracket 3 via a flange 2c made, for example, of a metal.

In an aperture 2a1 longitudinally extending through central parts of the paired truncated cones 2a, a pipe 2b made, for example, of a metal is inserted. In the metal pipe 2b, a bolt 5 for fixedly securing the rubber mount 2 on the mounting platform 1a for the engine 1 is inserted via a washer 4. On and in engagement with a free end portion of the bolt 5, said free end portion being located on a side opposite to a head of the bolt 5, a plate, for example, of a circular shape is secured, and this plate 6 is fastened by a nut 7 which is in threaded engagement with the bolt 5. Therefore, the paired truncated cones 2a that make up the elastic member of the rubber mount 2 are both supported by the support bracket 3 in a state that they are held between the mounting platform 1a for the engine 1 and the plate 6.

The stoppers 8,9 are both arranged integrally with the support bracket 3. These stoppers 8,9 are each formed of plural plate members surrounding, for example, the elastic member of the rubber mount 2, specifically the paired truncated cones 2a. The stopper 8 fixedly secured on an upper side of the support bracket 3 is formed of two plate members 8a,8b, which are, for example, formed in a circular arc shape as viewed in plan and arranged with spaces formed between them at their corresponding opposite end portions. The stopper 9 fixedly secured on a lower side of the support bracket 3 is also formed of two plate members 9a,9b which are similar to the plate members 8a,8b.

As illustrated in FIGS. 1A to 1C, the plate members 8a,8b of the stopper 8 arranged on the upper side of the support bracket 3 are positioned close to the one of the paired truncated cone 2a, said one truncated cone 2a being arranged on the upper side, without leaving any substantial clearance between the plate members 8a,8b and a large-diameter base portion of the one truncated cone 2a. However, the plate members 8a,8b are arranged on the support bracket 3 such that a certain clearance is left open between the plate members 8a,8b and the mounting platform 1a of the engine 1.

Similarly, the two plate members 9a,9b of the stopper 9 arranged on the lower side of the support bracket 3 are positioned close to the other one of the paired truncated cone 2a, said other truncated cone 2a being arranged on the lower side, without leaving any substantial clearance between the plate members 9a,9b and a large-diameter base portion of the other truncated cone 2a. However, the plate members 9a,9b are arranged on the support bracket 3 such that a certain clearance is left open between the plate members 9a,9b and the plate 6 fitted on the bolt 5.

According to the first embodiment constructed as described above, when the engine 1 is driven and vibrates in the vertical direction and horizontal direction, its vibrations are absorbed by elastic deformations of the paired truncated cones 1a of the rubber mount 2. Even when vertical vibrations of the engine 1 become large and the mounting platform 1a for the engine 1 comes into contact with the plate members 8a,8b making up the stopper 8 on the upper side of the support bracket 3, the paired truncated cones 2a are prevented from any further, excessive deformation. As a consequence, the paired truncated cones 2a are protected from damage so that durability of the rubber mount 2 can be secured.

It is to be noted that the vibration-damping support device according to the first embodiment is held such that, when it is attached to the mounting platform 1a for the engine 1, the one of the paired truncated cones 2a, said one truncated cone 2a being positioned on the upper side, sags under the weight of the engine 1 itself. As a result, the clearance between the stopper 8 and the mounting platform 1a for the engine 1 is set beforehand smaller than that between the stopper 9 and the plate 6. Concerning the prevention of excessive deformations of the paired truncated cones 2a under vibrations of the engine 1 in the vertical direction, the stopper 8 therefore becomes dominant. Described specifically, excessive deformations of the paired truncated cones 2a are prevented primarily by the contact of the upper stopper 8 with the mounting platform 1a for the engine 1.

If vibrations of the engine 1 in the vertical direction become significantly large, for example, occasionally and the plate 6 fitted on the bolt 5 comes into contact with the stopper 9 arranged on the lower side of the support bracket 3, any excessive deformations of the paired truncated cones 2a are prevented.

The vibration-damping support device according to the first embodiment is effective for the damping of the engine 1 in the hydraulic excavator. Even when the engine 1 is driven and vibrates, the plate members 8a,8b,9a,9b, which make up the stoppers 8,9, can be maintained stationary although the paired truncated cones 2a,2b of the rubber mount 2 supported on the support bracket 3 deform under the vibrations of the engine, because the plate members 8a,8b,9a,9b are arranged on the support bracket 3 fixedly secured on the revolving frame. As mentioned above, the paired truncated cones 2a and the plate member members 8a,8b,9a,9b, which make up the respective stoppers 8,9, can be arranged without occurrence of an interference between them under vibrations of the engine 1 although substantially no clearance is left open between them. As a consequence, the outer diameter dimensions of the plate members 8a,8b,9a,9b, which make up the respective stoppers 8,9, can be reduced, thereby making it possible to reduce a space required for the installation of the vibration-damping support device itself according to the first embodiment. It is, therefore, possible to provide the layout design of equipment, which is to be installed around the vibration-damping support device according to the first embodiment, with a greater degree, of freedom, and therefore, the vibration-damping support device according to the first embodiment can also be installed even in a machine that is prone to restrictions on an installation space for equipment, such as a hydraulic excavator of the small swing radius type.

The stoppers 8,9 are formed of the plate members 8a,8b, 9a,9b surrounding the paired truncated cones 2a of the rubber mount 2, and it is unnecessary to form the stoppers 8,9 in a shallow cup shape. Upon manufacturing the stoppers 8,9 by press work, they can hence be manufactured by using a press machine of relatively small capacity. Moreover, the stoppers 8,9 may be manufactured in some instances by cutting work which is simpler than press work. The manufacture of these stopper 8,9 can be facilitated whichever machining work is adopted. It is also possible to decrease the manufacturing man-hour of the vibration-damping support device according to the first embodiment.

A desired stopper function, specifically a function to prevent excessive deformations of the paired truncated cones 2a of the rubber mount 2 can be secured by the respective plate members 8a,8b,9a,9b of the stoppers 8,9 by setting beforehand the thickness dimension of each of the plate members 8a,8b,9a,9b such that upon contact of the engine 1 with the plate members 8a,8b,9a,9b, the contact areas of the plate members 8a,8b,9a,9b become large enough to retain strength such that the paired truncated cones 2a are not damaged by the contact of the engine. Moreover, the material cost can be saved upon manufacture of the stoppers 8,9 by arranging the plate members, for example, the plate member 8a and the plate member 8b of the stopper 8 with spaces formed between them at their corresponding opposite end portions as illustrated in FIG. 1C.

Further, the plate members 8a,8b,9a,9b of the stoppers 8,9 are each formed in a circular arc shape, that is, a simple shape as viewed in plan. Therefore, the manufacture of these plate members 8a,8b,9a,9b is easy, thereby contributing to a reduction in the manufacturing man-hour of the stoppers 8,9.

FIGS. 2A and 2B are views illustrating a second embodiment of the vibration-damping support device according to the present invention, in which FIG. 2A is a front view and FIG. 2B is a cross-sectional view taken in the direction of arrow "C" of FIG. 2A.

The vibration-damping support device according to this second embodiment is constructed such that from the above-described vibration-damping support device according to the first embodiment, the stopper 9 arranged on the lower side of the support bracket 3 is eliminated and a washer 4a, the shape and dimensions of which are small, is fitted on the bolt 5 in place of the circular plate 6. The remaining construction is similar to the corresponding construction in the above-described vibration-damping support device according to the first embodiment.

Normal vibrations of the engine 1, which are produced by drive of the engine 1, are absorbed primarily by the one of the truncated cones 2a of the rubber mount 2, said one truncated cone 2a being arranged on the upper side of the support bracket 3, as mentioned above with respect to the first embodiment. In the second embodiment illustrated in FIGS. 2A and 2B, vibrations of the engine 1 can, therefore, be absorbed as in the first embodiment. As the stopper 8 formed of the two plate members 8a,8b is arranged on the support bracket 3, the second embodiment can bring about similar advantageous effects as the first embodiment.

Different from the first embodiment, the stopper 9 is not arranged on the lower side of the support bracket 3 in this second embodiment. It is, therefore, impossible to prevent excessive deformations of the paired truncated cones 2a of the rubber mount 2 under occasional large vibrations of the engine 1. The material cost can, however, be cut down, because the second embodiment has the construction that it is not provided with the stopper 9 and is provided with the washer 4a the shape and dimensions of which are smaller compared with the plate 6. In addition, it is possible to secure a large installation space for equipment to be arranged around the other truncated cone 2a on the lower side of the support bracket 3.

Figure 3B:
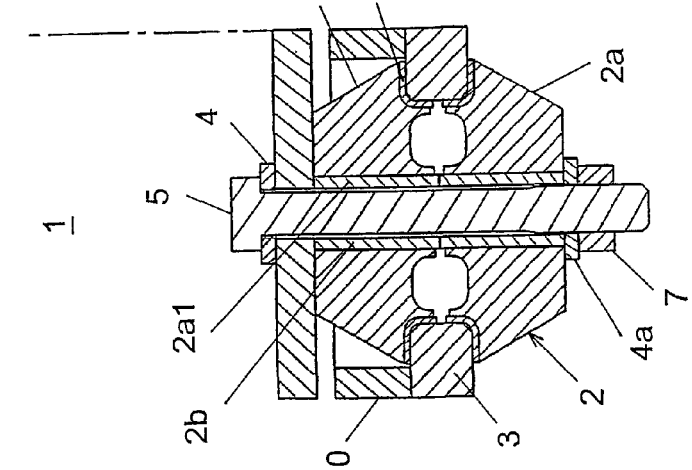
Figure 3A:
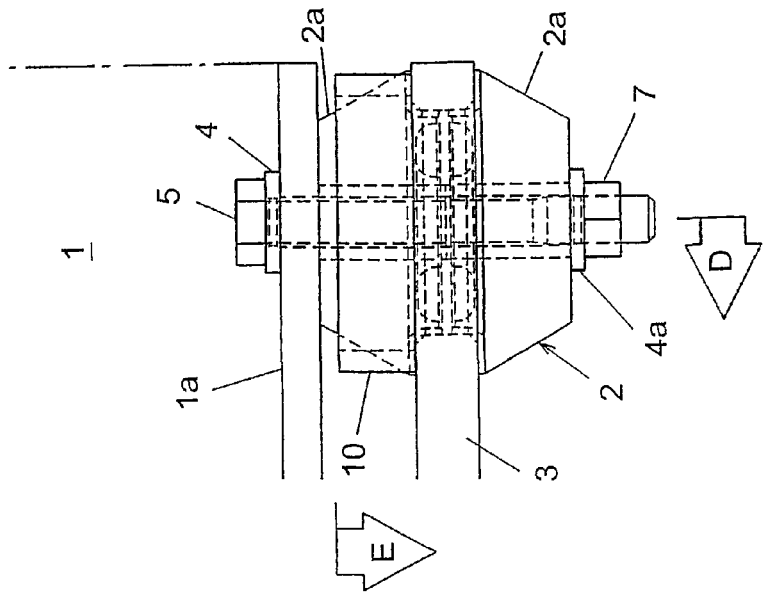
Figure 4A:
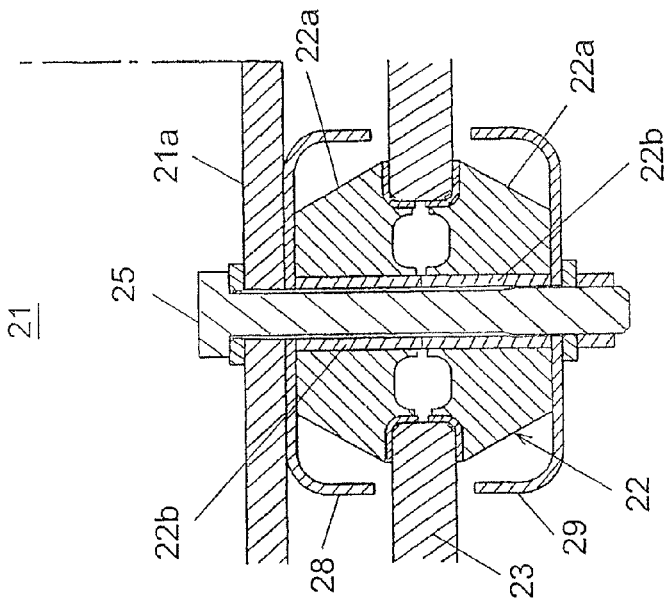
Figure 4B:
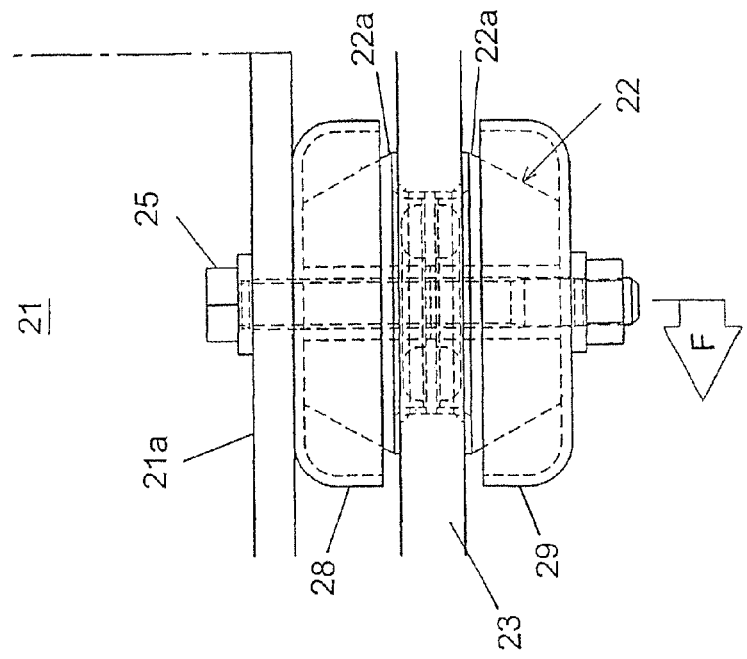

FIGS. 3A to 3C are views illustrating a third embodiment of the present invention, in which FIG. 3A is a front view, FIG. 3B is a cross-sectional view taken in the direction of arrow "D" of FIG. 3A, and FIG. 3C is a cross-sectional view taken in the direction of arrow "E" of FIG. 3A.

Similar to the above-described vibration-damping support device according to the second embodiment, the vibration-damping support device according to the third embodiment is provided with a stopper 10 on only the upper side of the support bracket 3. This stopper 10 is formed of two plate members 10a,10b, which are each formed, for example, in a polygonally-bent shape as viewed in plan. These plate members 10a,10b are arranged on the support bracket 3 and close to the rubber mount 2 such that the plate members 10a,10b surround the rubber mount 12 and no substantial clearance is formed between the plate members 10a,10b and the rubber mount 2. Further, the plate members 10a,10b, which make up the stopper 10, are also arranged such that openings 12 formed between the plate members 10a,10b of the stopper 10 at corresponding end portions thereof face equipment 11 arranged around the vibration-damping support device according to the third embodiment. The remaining construction is similar to the corresponding construction in the above-described vibration-damping support device according to the second embodiment.

As the stopper 10 formed of the two plate members 10a, 10b is also arranged on only the upper side of the support bracket 3 in the third embodiment constructed as described above, the third embodiment can bring about similar advantageous effects as the second embodiment. Further, the plate members 10a,10b of the stopper 10 are each formed in the polygonally-bent shape, that is, a simple shape as viewed in plan. This shape can be realized by bending work, so that the manufacture of these plate members 10a,10b is easy. The plate members 10a,10b, therefore, contribute to a reduction in the manufacturing man-hour of the stopper 10.

Further, the two plate members 10a,10b, which make up the stopper 10, are arranged such that the openings 12 formed between the plate members 10a,10b of the stopper 10 at the corresponding end portions thereof face the equipment 11 arranged around the vibration-damping support device according to the third embodiment. The equipment 11 can, therefore, be arranged sufficiently close to the vibration-damping support device according to the third embodiment. As a consequence, a large installation space can be secured for the equipment 11 to be arranged laterally to the vibration-damping support device according to the third embodiment.

The stoppers 8,9 are formed of the two plate members 8a,8b and the two plate members 9a,9b, respectively, in the first embodiment, the stopper 8 is formed of the two plate members 8a,8b in the second embodiment, and the stopper 10 is formed of the two plate members 10a,10b in the third embodiment. However, these stoppers 8,9,10 may each be formed of three or more plate members, or may each be formed of a plate member in the form of a cylindrical body having one or more seams.

Further, the stoppers 8,9,10 may each be formed of a plate member in the form of a seamless cylindrical body. The stoppers formed of plate members in the form of such cylindrical bodies can be easily manufactured, for example, by simply subjecting a metal pipe to cutting work.

LEGEND

1 Engine (object to be damped)
1a Mounting platform
2 Rubber mount (mount)
2a Truncated cone (elastic member)
2a1 Aperture
2b Metal pipe
2c Flange
3 Support bracket (support member)
4 Washer
4a Washer
5 Bolt
6 Plate
7 Nut
8 Stopper
8a Plate member
8b Plate member
9 Stopper
10 Stopper
10a Plate member
10b Plate member
11 Equipment
12 Opening

The invention claimed is:

1. A vibration-damping support device comprising:
a mount which is to be attached to an engine of a construction machine and has an elastic member for absorbing vibrations of the engine;
a support member which supports the mount thereon and is fixedly secured on a frame of the construction machine; and
stoppers for preventing an excessive deformation of the elastic member in an up-and-down direction under the vibrations,
the elastic member being formed of a pair of truncated cones that are arranged symmetrically about a horizontal plane, wherein:
one of the stoppers, which is fixedly secured on an upper side of the support member, is:
(i) arranged so as to come in contact with a mounting platform of the engine under vibrations of the engine,
(ii) positioned with one end fixedly secured on the upper side of the support member close to a base portion of a large-diameter of one of the truncated cones which is located on the upper side; and
(iii) arranged integrally with the support member forming a certain space gap between the mounting platform of the engine and the support member, such that when vertical vibration of the engine becomes larger, the mounting platform of the engine comes into contact with the stopper arranged integrally with the support member without occurrence of an interference between the elastic member and the stopper and excessive deformation of the elastic member is prevented.

2. The vibration-damping support device according to claim 1, wherein:
the one stopper comprises a plate member surrounding the elastic member of the mount.

3. The vibration-damping support device according to claim 2, wherein:
the one stopper comprises a plurality of plate members.

4. The vibration-damping support device according to claim 3, wherein:
the plate members are each formed in a circular arc shape as viewed in plan or a polygonally bent shape as viewed in plan.

5. The vibration-damping support device according to claim 2, wherein:
one of the pair of truncated cones, said one truncated cone being located on the upper side, is to be arranged on a side closer to the engine,
the support member comprises a support bracket for supporting thereon the elastic member at a vertically middle part thereof, and
the plate member or one of a plurality of plate members is arranged on an upper side of the support bracket such that the plate member or the one plate member surrounds the one truncated cone located on the upper side.

6. The vibration-damping support device according to claim 3, wherein:
one of the pair of truncated cones, said one truncated cone being located on the upper side, is to be arranged on a side closer to the engine,
the support member comprises a support bracket for supporting thereon the elastic member at a vertically middle part thereof, and
the plate member or one of the plate members is arranged on an upper side of the support bracket such that the plate member or the one plate member surrounds the one truncated cone located on the upper side.

7. The vibration-damping support device according to claim 4, wherein:
- one of the pair of truncated cones, said one truncated cone being located on the upper side, is to be arranged on a side closer to the engine,
- the support member comprises a support bracket for supporting thereon the elastic member at a vertically middle part thereof, and
- the plate member or one of the plate members is arranged on an upper side of the support bracket such that the plate member or the one plate member surrounds the one truncated cone located on the upper side.

\* \* \* \* \*